United States Patent
DeKoning et al.

(10) Patent No.: US 6,567,889 B1
(45) Date of Patent: May 20, 2003

(54) APPARATUS AND METHOD TO PROVIDE VIRTUAL SOLID STATE DISK IN CACHE MEMORY IN A STORAGE CONTROLLER

(75) Inventors: Rodney A. DeKoning, Wichita, KS (US); Gerald J. Fredin, Wichita, KS (US); Donald R. Humlicek, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 748 days.

(21) Appl. No.: 08/994,250

(22) Filed: Dec. 19, 1997

(51) Int. Cl.[7] .............................................. G06F 13/00
(52) U.S. Cl. ...................................... 711/114; 711/113
(58) Field of Search .............................. 711/113, 114, 711/129

(56) References Cited

U.S. PATENT DOCUMENTS

| | | | |
|---|---|---|---|
| 5,341,381 A | 8/1994 | Fuller | 714/6 |
| 5,416,915 A | 5/1995 | Mattson et al. | 711/114 |
| 5,418,921 A | 5/1995 | Cortney et al. | 711/114 |
| 5,517,632 A * | 5/1996 | Matsumoto et al. | 711/114 |
| 5,548,711 A | 8/1996 | Brant et al. | 714/5 |
| 5,586,248 A | 12/1996 | Alexander et al. | 714/22 |
| 5,586,291 A | 12/1996 | Lasker et al. | 711/113 |
| 5,603,002 A | 2/1997 | Hashimoto | 711/113 |
| 5,603,058 A | 2/1997 | Belknap et al. | 710/35 |
| 5,650,969 A * | 7/1997 | Niijima et al. | 365/200 |
| 5,761,705 A * | 6/1998 | DeKoning et al. | 711/113 |
| 5,778,426 A * | 7/1998 | DeKoning et al. | 711/122 |
| 5,895,485 A * | 4/1999 | Loechel et al. | 711/119 |

OTHER PUBLICATIONS

M. Nelson et al., "Caching in the Sprite Network File System," ACM Transactions on Computer Systems, vol. 6, No. 1, Feb. 1988, pp. 134–154.*
IBM Technical Disclosure Bulletin, Use of Non–Volatile Semiconductor Storage For Disk Array Parity, vol. 33, No. 6B, Nov. 1990, p. 254.*

* cited by examiner

Primary Examiner—David L. Robertson
(74) Attorney, Agent, or Firm—Lathrop & Gage, L.C.

(57) ABSTRACT

A portion of a storage controller's cache memory is used as a virtual solid state disk storage device to improve overall storage subsystem performance. In a first embodiment, the virtual solid state disk storage device is a single virtual disk drive for storing controller based information. In the first embodiment, the virtual solid state disk is reserved for use by the controller. In a second embodiment, a hybrid virtual LUN is configured as one or more virtual solid state disks in conjunction with one or more physical disks and managed using RAID levels 1–6. Since the hybrid virtual LUN is in the cache memory of the controller, data access times are reduced and throughput is increased by reduction of the RAID write penalty. The hybrid virtual LUN provides write performance that is typical of RAID 0. In a third embodiment, a high-speed virtual LUN is configured as a plurality of virtual solid state disks and managed as an entire virtual RAID LUN. Standard battery backup and redundant controller features of RAID controller technology ensure virtual solid state disk storage device non-volatility and redundancy in the event of controller failures.

50 Claims, 3 Drawing Sheets

APPARATUS AND METHOD TO PROVIDE VIRTUAL SOLID STATE DISK IN CACHE MEMORY IN A STORAGE CONTROLLER

RELATED PATENTS

This patent is related to commonly assigned, co-pending, U.S. patent application Ser. No. 08/630,906 entitled MAINTAINING CACHE CONSISTENCY IN A RAID CONTROLLER HAVING REDUNDANT CACHES filed Apr. 4, 1996, which is hereby incorporated by reference.

This patent is also related to commonly assigned, co-pending, U.S. patent application Ser. No. 08/772,614 entitled METHODS AND APPARATUS FOR COORDINATING SHARED MULTIPLE RAID CONTROLLER ACCESS TO COMMON STORAGE DEVICES filed Dec. 23, 1996, which is hereby incorporated by reference.

BACKGROUND OF THE INVENTION

1. Field of the Invention

This invention relates to the field of solid state logical units and in particular to a storage controller that includes a virtual solid state disk partitioned from cache memory.

2. Discussion of Related Art

Redundant Arrays of Inexpensive Disks (RAID) systems are disk array storage systems designed to provide large amounts of data storage capacity, data redundancy for reliability, and fast access to stored data. RAID provides data redundancy to recover data from a failed disk drive and thereby improve reliability of the array. Although data in the disk array may be distributed over the plurality of disks in the array, to the user portions of the disk array (logical units or LUNs) are mapped to appear as single disks.

There are several different methods to implement RAID. RAID level 1 protects stored data by duplicating the stored data and storing the original data and duplicated data on separate disks. RAID level 0 provides no enhanced data reliability but does enhance I/O performance by distributing data across multiple data disks in the array. Other implementations of RAID, levels 2, 3, 4, 5, and 6 distribute data across multiple data disks in the array to improve performance and provide for a block (or multiple blocks) of redundancy information (e.g., parity) that is distributed over the disk drives.

On each disk, data is mapped and stored in predefined blocks generally having fixed size. A predefined number of blocks of data and redundancy information, from each disk of the array, are mapped to define a stripe of data. RAID levels 2, 3, 4, 5, and 6 do not provide the I/O performance of RAID 0 due to overhead associated with maintenance of the redundancy information (e.g., parity). However, RAID levels 2–6 enhance data redundancy in comparison with RAID level 0.

In RAID level 3, and 4, the parity information is stored in a dedicated parity disk. In RAID levels 5 and 6, the parity information is interleaved across all the disks in the array and is part of the stripe. In RAID levels 3, 4, 5, and 6 parity is computed using the boolean bitwise Exclusive OR (XOR) function, whereas in RAID level 2, parity is computed using the Hamming Code. In RAID level 6, there are two independent parity computations and both are interleaved across the disks.

In RAID levels 2, 3, 4, 5, and 6 I/O performance suffers during write operations to disk due to the need for updating the parity information on the disk array. This performance degradation is often referred to as a write penalty. This write penalty is due to redundancy algorithms (parity computations) that require additional accesses to disk to read and write data. I/O performance is principally measured by the I/O request rate; that is, the time required for executing I/O requests. The time required to execute the read or write operation is defined at a minimum by the time required by disk heads to reach the starting point of data on the disk. Time required to access disk drives in a storage subsystem is therefore the predominant factor in degrading I/O performance.

To improve I/O performance, current RAID controllers include cache memory subsystems attached to the controller to provide efficient I/O operations. Write operations in particular are completed more quickly by storing the host supplied data in cache memory, allowing the host system to carry on, and later posting the data to the disk drives (e.g., write-back caching). The access time to cache is very fast as compared to typical disk drives. The controller later transfers the data from cache to the disk drive for permanent storage. This use of cache defers imposition of the write penalty caused by the redundancy algorithms of RAID levels 2, 3, 4, 5, and 6 but does not eliminate the write penalty.

Other known techniques to reduce the impact of the write penalty use log areas to record information, such as new data, new parity, old data, and/or old parity for later processing in parity computations or for later storing to disk. Use of the log space helps assure reliable data storage (recoverable in case of a failure) until the information can be permanently stored on disk in accordance with the selected RAID management technique. Though new and old data is temporarily saved in a log space, RAID systems using such logging techniques still require writing parity information to disk to permanently store this information and ensure data can be reconstructed in case of a disk failure. Logging techniques, like caching methods, therefore serve to defer the imposition of the write penalty rather than eliminate it because an access to disk is required to write the parity permanently to disk.

These caching and logging methods improve overall performance but do not completely mitigate the I/O performance degradation (parity write penalty) during RAID operations. RAID levels 2, 3, 4, 5, and 6 implemented with present technology, require parity information (or similar redundancy information) and eventually must be updated on the disk array to ensure data reliability. Cache operations or logging operations, as noted above, serve only to delay the inevitable imposition of the RAID write penalty, that is writing parity information to disk.

It is also known to couple RAID controllers to use one or more physical solid state disk devices in place of standard rotating media disk devices. Solid state disk drives use fast RAM memory in place of rotating disk magnetic media and associated moving read/write heads. The purpose of the solid state disk device is to emulate a standard rotating disk drive and thereby improve I/O performance by storing data and/or parity in the higher speed solid state device. Though such devices can dramatically reduce the RAID write penalty, they are stand-alone devices external to the RAID controller. These external solid state disk drives add significant cost to a subsystem due to packaging and interconnection complexity of an external device. Further, external solid state disks are connected to the RAID controller via SCSI or other well known peripheral interconnect protocols and media. Such interconnection interfaces impose a secondary performance limitation as compared to cache memory techniques discussed above. Still further costs are added to a subsystem if spare solid state disks are used in the system to provide hot-swap spares for replacement of a failed solid state disk.

It can be seen from the above discussion that a need exists to improve RAID subsystem performance to reduce RAID write penalties without adding significant cost or complexity to the subsystem.

SUMMARY OF THE INVENTION

The present invention solves the above and other problems, thereby advancing the useful arts, by creating one or more virtual solid state disks within a primary RAID controller cache memory. In a first embodiment, the controller uses one or more virtual solid state disks as a private disk storage by reserving for itself the use of the virtual solid state disks. In a second embodiment, a virtual LUN is configured as one or more of the virtual solid state disks operating in conjunction with other physical disks in the disk array. In a third embodiment, a virtual logical unit, that is, a virtual LUN is configured as a one or more virtual solid state disks. According to the present invention, a redundant controller present in the disk array subsystem automatically mirrors the contents of the virtual disk defined within the cache memories. Mirroring of cache between the primary and redundant controllers is an aspect of normal cache operations in some such redundant pairs of controllers.

Specifically, the present invention defines one or more virtual solid state disks within a section of the cache memory of the primary storage controller. In the first embodiment of the present invention, the controller utilizes the virtual solid state disk as a private disk storage unit to store for example, disk array configuration information or information regarding block mapping. The virtual solid state disk can also be utilized to store temporary information. The virtual disk and the virtual LUN is preferably defined within a battery-backed cache memory and is therefore essentially non-volatile with respect to power or reset cycle of the controller.

A person skilled in the art, however, will recognize that a virtual solid state disk storing temporary information does not need to be defined within battery-backed cache memory. For example, operating systems contain scratchpad storage to store non-critical information such as intermediate computation results. It is not necessary to store this non-critical information within a non-volatile storage. Therefore within a controller, it is possible to configure a virtual solid state disk in volatile memory.

In a second embodiment of the present invention, the virtual LUN is a hybrid combination of one or more virtual solid disks and one or more physical disks. Such a high speed LUN is useful, for example, in database applications where transaction checkpoints and logs are frequently updated to assure database structural integrity or in journal file systems where a journal update frees the application to continue processing.

In the third embodiment of the present invention, the controller manages the virtual LUN using RAID management techniques. The controller utilizes any RAID level 1–6 to store host information, such as log files for transactions processing host applications. This high-speed virtual LUN is substantially faster than storing information on a standard rotating disk drive because the virtual disk is defined within the cache memory. This virtual LUN is faster than a real LUN comprised of physical disk drives, or the hybrid virtual LUN in the second embodiment, because the physical disk drives are slower than cache. Thus, the host utilizes the virtual solid state disk to store information for faster access than otherwise possible when the information is stored on disk.

A person skilled in the art will recognize that one or more of these embodiments can be configured within one or more RAID controllers.

The present invention improves I/O performance in numerous ways by utilizing high-speed cache memory in the RAID controller as one or more virtual disks to store information rather than storing this information in disk drives. Since the logical unit is in the cache memory of the controller, data access times are reduced and throughput is increased by retrieving the data from the faster virtual solid state disk(s) rather than from the slower disk drive. Storing parity and/or data in the virtual solid state disk reduces the number of disk accesses. The RAID write penalty is substantially eliminated because parity is not written to a slow rotating disk.

The present invention maintains the data reliability features of RAID. To ensure data availability, the virtual solid state disk is preferably defined within battery-backed cache memory as is provided by many available RAID controllers. Furthermore, a redundant controller and the primary controller are configured in normal operation to mirror one another's cache content, and thus the virtual solid state disk content is mirrored. This aspect of the present invention helps ensure data redundancy for the data stored in the virtual disk(s) in the event the primary controller fails.

The virtual solid state disk within the controller's cache memory reduces costs as compared to prior solutions using external solid state disks. As noted above, external solid state disks add complexity (and hence costs) through the addition of device packaging, control electronics, and interconnection media between the external device and the controller. By contrast the virtual disk(s) of the present invention are embodied within the cache memory already present on the storage controllers. This reduces costs by eliminating need for additional device packaging, special control electronics, and for special interconnection of the virtual disk(s) and the controller.

The present invention also improves I/O performance over commercially available external solid state disks because data does not need to be retrieved from an externally attached solid state disk via the slower peripheral connection bus (e.g., EIDE, SCSI, etc.). Rather, the present invention manipulates data in the virtual disk(s) by access to cache memory integrated into the controllers.

It is therefore an object of the present invention to provide apparatus and associated methods of operation for improving storage subsystem performance by defining at least one virtual disk within a storage subsystem controller's cache.

It is therefore an object of the present invention to provide apparatus and associated methods of operation for improving storage subsystem performance by defining at least one virtual disk within a storage subsystem controller's cache that is not accessible by the host.

It is yet a further object of the present invention to provide apparatus and associated methods of operation for improving storage subsystem performance by defining a virtual LUN comprising one or more virtual disks defined within a RAID storage subsystem controller's cache.

It is yet still a further object of the present invention to provide apparatus and associated methods of operation for improving storage subsystem performance by defining a virtual LUN comprising at least one virtual disk and at least one physical disk within a RAID storage subsystem controllers cache.

It is still a further object of the present invention to provide apparatus and associated methods of operation for improving storage subsystem reliability by providing mirroring capability using the RAID storage subsystem primary controller cache and redundant controller cache.

It is still yet a further object of the present invention to provide apparatus and associated methods of operation for improving storage subsystem reliability by defining a virtual disk within the battery-backed portion of cache.

It is another object of the present invention to provide apparatus and associate methods of operation for improving storage subsystem reliability by defining a virtual LUN comprising one or more virtual disks defined within a RAID storage subsystem controller's battery-backed portion of cache.

It is still another object of the present invention to provide apparatus and associate methods of operation for improving storage subsystem I/O performance and reliability by defining a virtual LUN comprising a plurality of virtual disks defined within a RAID storage subsystem controller that can be also accessed through a redundant RAID storage subsystem controller.

The above and other objects, aspects, features, and advantages of the present invention will become apparent from the following description and the attached drawings.

DETAIL DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
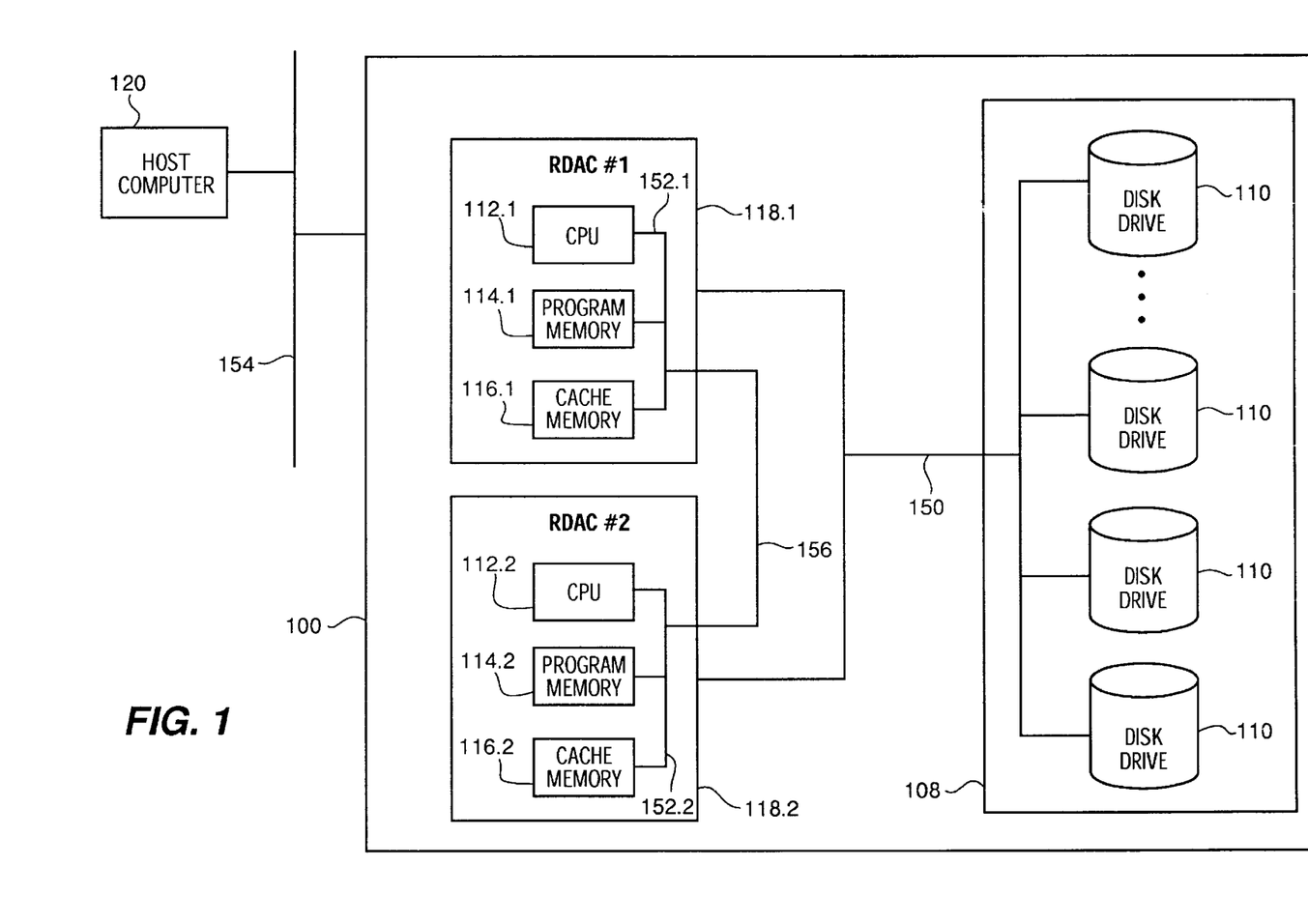
FIG. 1 is a block diagram of a typical RAID storage subsystem with redundant controllers in which the virtual disk storage device of the present invention is advantageously applicable.

FIG. 1 is a block diagram of a typical redundant controller RAID storage subsystem in which the virtual disk storage device of the present invention is advantageously applicable. FIG. 1 is a block diagram of a typical RAID storage subsystem 100, having redundant disk array controllers 118.1 and 118.2 (hereinafter referred to as RDACs and as primary and redundant controllers), in which the methods and associated apparatus of the present invention may be applied. RAID storage subsystem 100 includes at least one pair of RDACs 118.1 and 118.2. Each RDAC 118.1 and 118.2 is in turn connected to disk array 108 via bus (or busses) 150 and to host computer 120 via bus 154. Disk array 108 is comprised of a plurality of disk drives 110. One of ordinary skill in the art will readily recognize that interface bus 150 between RDACs 118.1 and 118.2 and disk array 108 (including disk drives 110) may be any of several industry standard interface busses including SCSI, IDE, EIDE, IPI, Fibre Channel, SSA, PCI, etc. Circuits (not shown) within RDACs 118.1 and 118.2 appropriate to controlling bus 150 are well known to those of ordinary skill in the art.

Interface bus 154 between RDACs 118.1 and 118.2 and host computer 120 may be any of several standard industry interface busses including SCSI, Ethernet (LAN), Token Ring (LAN), Fibre Channel etc. Circuits (not shown) within RDACs 118.1 and 118.2 appropriate to controlling bus 154 are well known to those of ordinary skill in the art.

As shown in FIG. 1, RAID storage subsystem 100 may be utilized to implement any of the well known RAID levels (e.g. levels 0–6). The various RAID levels are distinguished by the manner in which the associated RAID controller logically subdivides or partitions the disk drives 110 in disk array 108. For example, when implementing RAID level 1 features, approximately half of the disk drives 110 of disk array 108 are used to store and retrieve data while the other half is operated by the RAID controller to mirror the data storage contents of the first half. Further, when implementing RAID level 4 features, the RAID controller utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

RDAC 118.1 includes CPU 112.1, program memory 114.1 (e.g. ROM/RAM devices for storing program instructions and variables for the operation of CPU 112.1), and cache memory 116.1 for storing data and control information related to the data stored in disk array 108. CPU 112.1, program memory 114.1, and cache memory 116.1 are connected via memory bus 152.1 to enable CPU 112.1 to store and retrieve information in the memory devices. The data structures of the present invention are embodied within cache memory 116.1 and are created and manipulated by methods operable within CPU 112.1. RDAC 118.2 is identical to RDAC 118.1 and is comprised of CPU 112.2, program memory 114.2 and cache memory 116.2, all interconnected via memory bus 152.2. To permit each RDAC to communicate with the other, the RDACs 118.1 and 118.2 are interconnected via shared bus 156. The RDACs 118.1 and 118.2 are interchangeable devices within RAID subsystem 100 to permit easy replacement, including hot swap, of a defective RDAC.

In addition, each RDAC cache memory includes a battery subsystem, or other well known apparatus to maintain the validity (non-volatility) of the associated cache memory through power loss to the RDAC module.

One of ordinary skill in the art will readily recognize that the block diagram of FIG. 1 is intended only as an exemplary design, which may embody the present invention. Many redundant controller and subsystem designs may embody the methods and associated apparatus and structures of the present invention. Specifically, one of ordinary skill in the art will recognize that the present invention is operable in a storage subsystem containing N disk controllers.

Figure 2:
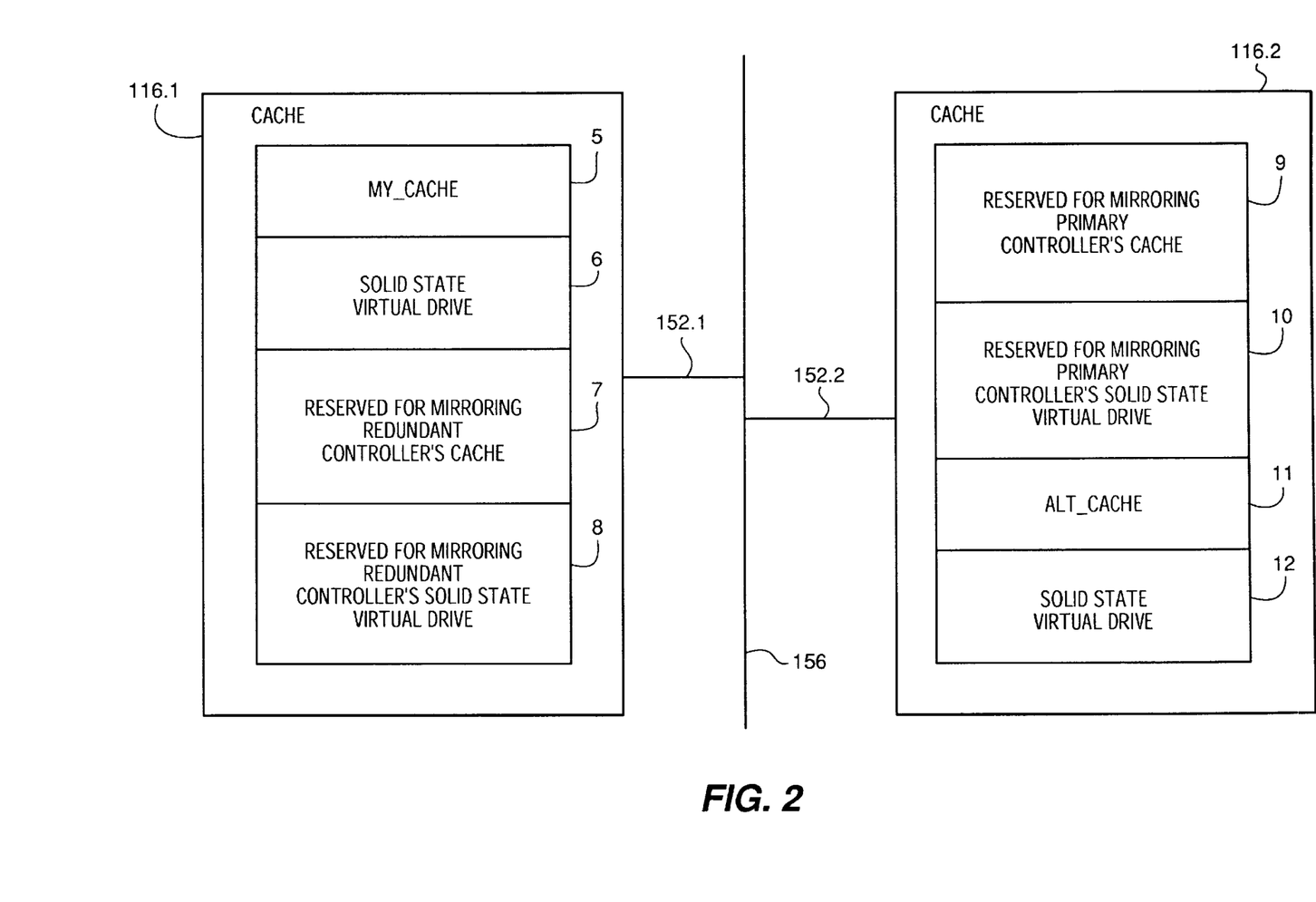
FIG. 2 is a block diagram of the first and second embodiments of the present invention showing an exemplary partitioned cache for the primary and redundant controllers.

FIG. 2 shows RDAC 1 118.1 cache memory 116.1 (FIG. 1) logically partitioned into four sections. In the present invention, one partition is a virtual solid state disk 6 in a section of the battery-backed cache memory 116.1 (FIG. 1). The virtual solid state disk 6 emulates a disk drive and since the virtual solid state disk 6 is configured within the battery-backed cache memory 116.1, it is therefore non-volatile and can withstand power interruptions within the RDAC. A person skilled in the art will recognize the number and size of the partitions defined in cache memory depend upon the amount of cache memory available in the controller as well as configuration parameters dependent on usage and I/O characteristics.

RDAC 1 118.1 cache memory 116.1 is partitioned into several sections. Particularly, a section MY_CACHE 5 for caching information, a section for the virtual solid state disk 6, a section 7 for mirroring ALT_CACHE 11, and a section 8 to mirror RDAC 2 118.2 virtual solid state disk 12. RDAC 2 118.2 cache memory 116.2 is similarly partitioned. Cache memory 116.2 contains a section 9 operable for mirroring MY_CACHE 5, a section 10 for mirroring RDAC 1 118.1 virtual solid state disk 6, ALT_CACHE section 11 for caching information, and a virtual solid state disk 12.

In the first embodiment of the present invention, the primary controller configures at least one virtual solid state disk 6 within cache memory 116.1. The redundant controller similarly defines at least one virtual solid state disk 12 within cache memory 116.2. In this embodiment, the controller utilizes the virtual solid state disk 6 as a private disk storage unit. That is, the controller rather than the host utilizes the virtual solid state disk 6 to store information for faster access than otherwise possible when the information is stored on disk. Such information stored on disk includes but is not limited to disk array configuration information or block mapping information. Alternatively, the virtual solid state disk 6 may be utilized to store temporary information such as intermediate computation results that would otherwise be stored in scratch pad memory.

Though caching and logging provide some relief from the RAID write penalty by deferring the imposition thereof, they do so at the cost of added complexity in the RAID control functions. For example, the RAID control functions must be specifically designed to manage cache and log areas differently than they manage disk drives. The embodiments of the present invention enable significant reduction of the RAID write penalty without the need for such custom designs within the RAID control functions.

In the second embodiment of the present invention, a hybrid virtual LUN is configured as one or more virtual solid state disks 6 operating in conjunction with one or more physical disks in the disk array. In this embodiment, the controller manages the virtual LUN in accordance with any of the RAID 1, 2, 3, 4, 5, or 6 levels. The hybrid virtual LUN is operable to mirror data utilizing RAID level 1 techniques, or to store data or parity utilizing any of the RAID levels 2, 3, 4, 5, or 6.

The hybrid virtual LUN is used in conjunction with a RAID level 2, 3, 4, 5, or 6 mapping to provide write performance that is close to the performance of a RAID 0 write. By using the virtual LUN to store parity information, the present invention provides the RAID controller the ability to attain very high data transfer capacity and I/O request rates by reducing the number of accesses to disk.

RAID level 0, unlike other RAID techniques, does not perform any data redundancy to protect against a disk failure. Rather, RAID level 0 merely maps (distributes) data across the disks in an array to thereby improve I/O performance. As noted above, other RAID techniques impose a penalty, often referred to as the write penalty, because they maintain redundancy (parity) information on the disk array in addition to the actual data. When updating data stored on the RAID disk array where such parity information is maintained, the process must include the update of the parity information. This parity information update degrades the overall RAID subsystem performance due to the increased access to the relatively slow disk drives.

Although parity is still computed in the present invention, the parity can be essentially instantaneously written in the hybrid virtual LUN defined in the controller cache memory. The present invention is thereby achieving performance approaching that of a RAID level 0 disk array which does not suffer the write penalty. The write penalty is strictly speaking still present in the operation of the present invention. However, its performance impact is dramatically reduced due to the high speed of accessing the virtual solid state disk 6, within the hybrid virtual LUN, storing the parity information as compared to access time for physical disk drives.

The present invention provides reliability for data stored in the virtual solid state disk 6, in the first and second embodiments, through normal operation of RDAC 1 118.1 (FIG. 1) and RDAC 2 118.2 (FIG. 1). Normal operation of redundant controllers utilize inter-controller communication techniques to synchronize and mirror the contents of the cache memories in the redundant controllers. Each CPU 112.1 or 112.2 within each RDAC 118.1 or 118.2 can manipulate the cache memory 116.1 or 116.2 of the other RDAC via shared bus 156. The RDACs may be utilized in several modes depending upon software and control methods operable within CPU 112.1 and 112.2. Cache 116.1 is connected via bus 152.1 to shared bus 156. Similarly, cache 116.2 is connected via bus 152.2 to shared bus 156.

In the dual-active RDAC pair mode (active/active), each of the pair of RDACs 118.1 and 118.2 is active in parallel with the other to maintain cache information in its own cache as well as the cache of the redundant RDAC. In this mode, each RDAC of the pair has a complete snapshot of the present cache information as maintained by itself and its paired RDAC—the redundant RDAC. When a RDAC is initialized, the RDAC with an invalid cache memory content may update its cache memory from the redundant RDAC's cache memory, by updating the invalid cache memory with the valid cache memory of the redundant RDAC.

In the active-passive RDAC pair mode of operation, one of either RDAC 118.1 or 118.2 is deemed to be "active" such that it processes host computer I/O requests to maintain its cache memory while the other RDAC is "passive" in that it simply maintains a copy in its cache memory of the cache memory in the active RDAC. The passive RDAC does not process host computer I/O requests. Rather, the active RDAC processes host computer I/O requests, updates its own cache memory accordingly, and maintains a mirror image of its cache memory in the cache memory of the redundant RDAC. Thus if RDAC 118.1 is active, it maintains its cache memory 116.1 by processing host computer I/O requests and updating the cache memory 116.1 accordingly. As CPU 112.1 updates its active cache memory 116.1 via bus 152.1, it also mirrors the cache changes to passive cache memory 116.2 in the passive RDAC 118.2 via shared bus 156.

In the active-passive RDAC pair mode of operation, the cache memories 116.1 and 116.2 associated with the RDACs 118.1 and 118.2 are maintained by the active RDAC. This permits the passive RDAC of the pair to immediately assume control when a failure of the primary RDAC is sensed. Similarly, when an RDAC pair is initialized, the RDACs may synchronize the cache memories of the two RDACs by copying from one to another. For example, if the active RDAC 118.1 cache memory 116.1 is invalid, the valid cache memory 116.2 content of the passive RDAC 118.2 may be copied to the cache memory 116.1 of the active RDAC 118.1. Conversely, if the passive RDAC 118.2 cache memory 116.2 is invalid when the RDAC pair is initialized, the valid cache memory 116.1 content of the active RDAC 118.1 may be copied to the cache memory 116.2 of the passive RDAC 118.2.

In a disk storage subsystem with N active controllers, each active controller with a virtual solid state disk in cache mirrors at least one other active controller. Thus, allowing each active controller to have a complete snapshot of the present cache information as maintained by itself and at least one other active controller within the disk storage subsystem. Similarly, in a disk storage subsystem with N passive controllers, each passive controller with a virtual solid state disk in cache mirrors at least one other active and may mirror at least one passive controller.

These known techniques for mirroring the contents of caches in redundant controllers provides the added benefit of mirroring the virtual solid state disk 6 contents of the first embodiment or the virtual solid state disk 6 contents of the virtual LUN in the second embodiment. Due to cache mirroring, the second embodiment approaches the performance level of a RAID 0 disk array while providing the enhanced reliability of RAID levels 1–6. A person skilled in the art, however, will recognize that the present invention is not limited to virtual solid state disks defined in battery-backed cache memory. Rather, a virtual solid state disk can be defined within volatile cache memory when utilized to store temporary or non-critical data.

In FIG. 1, disk drives 110 store data segments using RAID level 1–6 techniques. By storing for example, parity, data or mirrored data the hybrid virtual LUN thereby reduces the number of data accesses to disk during write operations, since some portion of the parity and/or data is stored on at least one virtual solid state disk 6 instead of a real disk drive 110. The hybrid virtual LUN allows for very high data transfer capacity and I/O request rate because the access time for a read or write to cache is very fast as compared to that of rotating disk drives.

Known external solid state disk drives can provide similar performance benefits (though to a lesser degree than that of the present invention) but at significantly higher cost. The present invention reduces costs relative to such external solid state disk drives because the cache memory used for the virtual disk drive is integrated into the controller electronics. Integrated cache memory costs less by eliminating the costs of packaging and separate power connections. Furthermore, the present invention has improved I/O performance over commercially available solid state disks because data is transferred over high-speed processor busses as compared to external peripheral interconnections (e.g., EIDE or SCSI).

There are additional benefits of the second embodiment when the RAID disk array subsystem is operating in degraded mode. If any disk drives 110 (FIG. 1) fail, the data recovery process is faster because the number of accesses to disk is reduced. If parity information or data needed for recovery resides in at least one faster virtual solid state disk 6 within the hybrid virtual LUN in the RDAC 1 118.1, the CPU 112.1 (FIG. 1) only needs to access the appropriate data segments in the slower operable disk drives to reconstruct the failed physical disk 110. If at least one virtual solid state disk 6 within the hybrid virtual LUN is used to mirror the data on the disk storage device 108, then data from the failed device can be easily retrieved from the virtual solid state disk 6 within the hybrid virtual LUN. Alternatively, if the virtual solid state disk 6 is configured as a spare disk, within the hybrid virtual LUN, the virtual solid state disk 6 can operate as a hot spare until a new physical disk is installed.

Furthermore, if RDAC 1 118.1 fails, data from MY_CACHE 5 and virtual solid state disk 6 can be retrieved from RDAC 2 118.2, which is configured to mirror data on RDAC 1 118.1 thus ensuring device and data redundancy. FIG. 2 shows partitioned cache memory section 9 is used for mirroring MY_CACHE 5 and partitioned cache memory section 10 is used for mirroring parity information on virtual solid state disk 6. Likewise if RDAC 2 118.2 fails, data from ALT_CACHE 11 and virtual solid state disk 12 can be retrieved from RDAC 1 118.1 by reading partitioned cache memory 116.2 sections 7 and 8 in RDAC 2 118.1.

In another application of the present invention, the hybrid virtual LUN is used to store log files for transaction processing host applications. For example, data base applications use small disk files to store log files that are operable to recover data in the event of a power failure or some other system restart. Updates to these logs occur frequently. During the update, other operations are waiting for the log to be updated. If such log files were stored on a standard RAID LUN (e.g. only physical disks), the RAID write penalty would severely impact the overall database performance. Rather, a hybrid virtual LUN may be used to provide faster, reliable storage of the log files. Storing the database log files in a hybrid virtual LUN utilizes the speed of the cache and reduces accesses to disk thus improving performance. Data in the virtual solid state disk 6 is mirrored via the cache partition 10 in RDAC 2 116.2 and data in virtual solid state disk 12 is mirrored via the cache partition 8 in RDAC 1 116.1 to ensure device redundancy. Data redundancy is vital to database application integrity since the log files are used to resynchronize the applications data in the event of an interruption.

Figure 3:
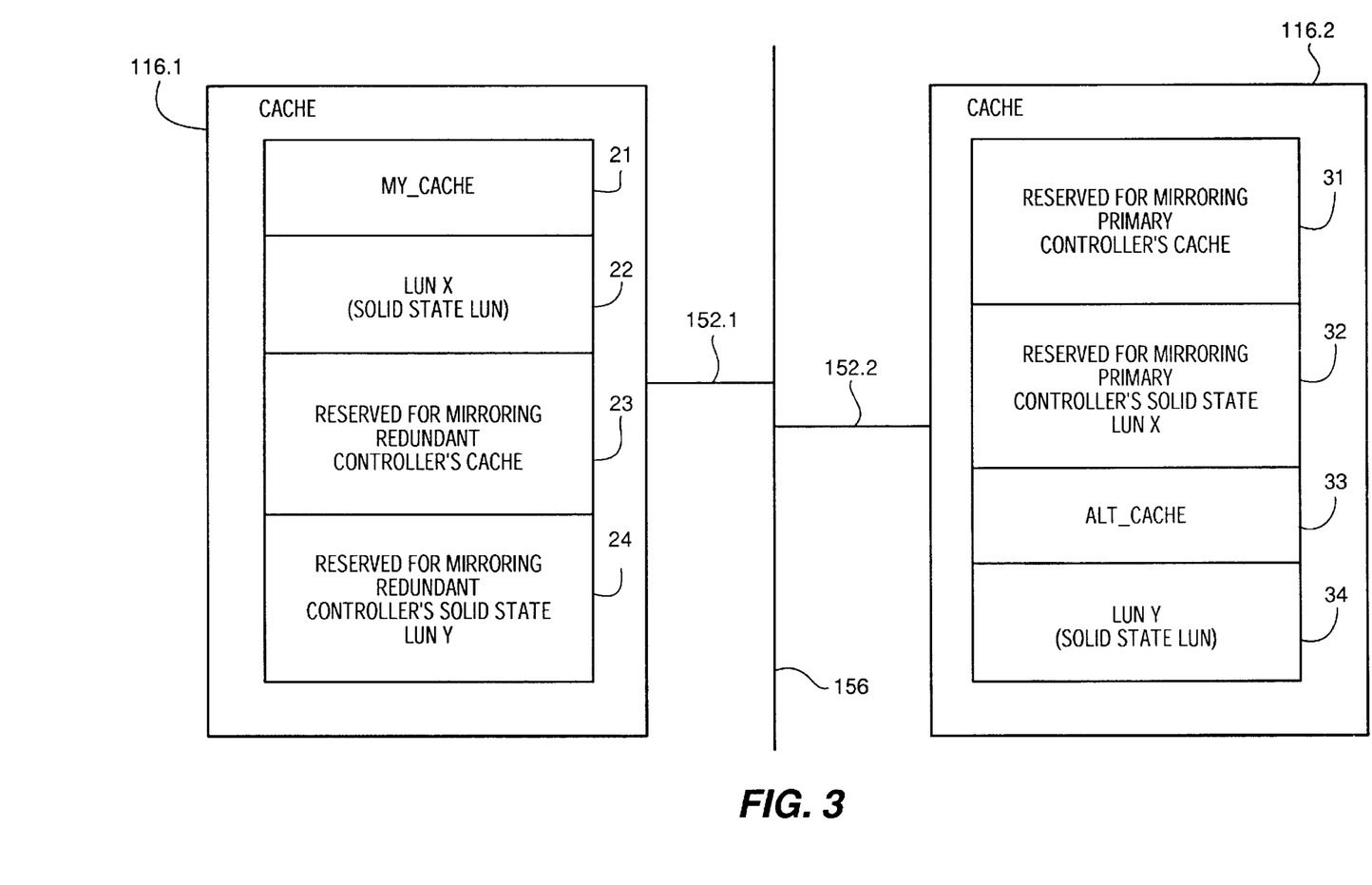
FIG. 3 is a block diagram of the third embodiment of the present invention showing an exemplary partitioned cache for the primary and redundant controllers.

FIG. 3 shows a third embodiment of the present invention. In this embodiment, the controller configures one or more virtual solid state disks as a high-speed virtual LUN. In this embodiment, the virtual LUN is utilized to store host data for faster access than otherwise possible when the information is stored on disk.

Cache memory 116.1 contains a virtual solid state disk storage device 22 logically defined as virtual LUN X 22 (also referred herein as virtual solid state disk storage device 22). LUN X 22 is within a section of the battery-backed cache memory 116.1 in RDAC 1 118.1. Since the LUN X 22 is configured in battery-backed cache memory 116.1 it is essentially non-volatile and will not lose data during power interruptions. LUN X 22 and LUN Y 34 can be defined as any RAID level when LUN X 22 or LUN Y 34 are operating alone as one virtual LUN (e.g., not in conjunction with disks 110 as implemented in the second embodiment).

As previously discussed, additional data reliability is available by using RDAC 2 118.2 to mirror RDAC 1 118.1 and thereby provide data redundancy in case RDAC 1 118.1. Cache memory 116.2 section 31 mirrors RDAC 1 118.1 fails cache memory 21, section 32 mirrors RDAC 1 118.1 virtual solid state disk 22, ALT_CACHE 33 is operable for caching, and section 34 operates as a virtual solid state disk (hereinafter referred to as LUN Y 34). RDAC 1 118.1 also provides data redundancy capability by allocating section 23 to mirror RDAC 2 118.2 ALT_CACHE 33. Section 24 in RDAC 1 118.1 mirrors RDAC 2 118.2 LUN Y 34. Mirroring capability is provided through inter-controller connections. Cache 116.1 is connected to shared bus 156 via bus 152.1. Similarly, cache 116.2 is connected to shared bus 156 via bus 152.2.

Since virtual LUN X 22 resides in cache, LUN X 22 operates much faster than disk drives 110 within of disk storage 108. In addition, virtual LUN X 22 operates much faster than disk drives 110 within disk storage 108 operating as part of a hybrid virtual LUN as in the second embodiment. LUN X 22 does not have to access data from the disk storage 108. Rather, all access to virtual LUN X 22 is through the associated cache memory partition 21 when the disk array subsystem is operating in active/passive mode. In active/active mode, LUN X 22 is also accessed via RDAC 2 118.2 through associated cache memory partition 33.

LUN Y 34 is similar to LUN X 22. LUN Y 34 is within the battery-backed cache memory 116.2 in RDAC 2 118.2 and is therefore non-volatile. LUN Y 34 is also comprised of one or more virtual solid state disks defined as a LUN and access to virtual LUN Y 34 is through associated cache memory partition 33 when the disk storage subsystem is operating in active/passive mode. In active/active mode, LUN Y 34 is also accessed via RDAC 1 118.1 through associated cache memory partition 21.

In this embodiment, LUN X or LUN Y can also be used to store log files for transactions processing host applications. For example, in database applications where transaction checkpoints and logs are frequently updated to assure database structural integrity or in journal file systems where a journal update frees the application to continue processing. The virtual LUN provides high-speed storage of the files. Accessing the virtual solid state disks, within the virtual LUN 22, 34, is faster than accessing data from physical disks 110, or physical disks 110 within a hybrid virtual LUN, because physical disks 110 are slower than cache memory.

The present invention is implemented by initializing cache, reserving a portion of cache memory, and logically configuring the reserved portion to be one or more virtual solid state disk storage devices. The virtual solid state disk, hybrid virtual LUN, or high-speed virtual LUN can be managed using RAID management techniques. Those skilled in the art will recognize that a balance may be struck between the amount of cache memory reserved for virtual disk definitions and the amount left over for standard caching operations in the RAID controller. Further, those skilled in the art will recognize that any number of disks in a RAID LUN may be defined as virtual disk drives in the cache memory. As shown in FIG. 2, one virtual disk drive 6 can be defined as part of a hybrid virtual LUN. Whereas, FIG. 3 shows the third embodiment in which all disks of a virtual disk drive 22, 34 are defined as a LUN within the cache memory of the RDAC. A variety of other configurations having varying numbers of drives in a LUN defined as virtual disk drives will be apparent to those skilled in the art.

The hybrid virtual LUN created using virtual solid state disks 6, 12 in the second embodiment, and the virtual LUNs in the third embodiment are defined and used in the same way as a normal logical unit is defined. A person skilled in the art will recognize parameters associated with a logical unit mapped to disk media, such as, size of LUN, mirror enable/disable, block size, cache block size and battery back enable/disable need to be defined in accordance with the design specifications of the RAID subsystem. An additional parameter may be supplied by the operator to request that the LUN be defined within cache memory of the controller. For example, a high-performance attribute may be assigned to the LUN when configured to indicate that the LUN is intended for high speed (perhaps lower capacity) applications.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An apparatus in a primary RAID disk array controller including a plurality of disks comprising:
   a first cache memory partition operable for caching; and
   a second cache memory partition operable as a virtual solid state disk storage device.

2. Apparatus of claim 1
   wherein said virtual solid state disk storage device in said primary RAID disk array controller comprises a plurality of virtual disk drives operated by said primary RAID disk array controller as a first virtual LUN.

3. Apparatus of claim 2
   wherein said first virtual LUN includes at least one or more virtual disk drives and at least one of said plurality of disks.

4. Apparatus of claim 1 wherein said virtual solid state disk storage device in said primary RAID disk array controller is operable to store information in accordance with RAID techniques.

5. Apparatus of claim 1 further comprising:
   a redundant RAID disk array controller comprising:
      a first redundant cache memory partition operable for caching; and
      a second redundant cache memory partition operable as a redundant virtual solid state storage device.

6. Apparatus of claim 5 wherein said redundant virtual solid state disk storage device in said redundant RAID disk array controller mirrors said virtual solid state disk storage device in said primary RAID disk array controller.

7. Apparatus of claim 5
   wherein said redundant virtual solid state disk storage device in said redundant RAID disk array controller is logically configured as a plurality of virtual disk drives operated by said redundant RAID disk array controller as a redundant RAID virtual LUN.

8. Apparatus of claim 5
   wherein said redundant virtual solid state disk storage device in said redundant RAID disk array controller is operable to store information in accordance with RAID techniques.

9. Apparatus of claim 1
   wherein said second cache memory partition is non-volatile.

10. A RAID disk array comprising:
    a plurality of RAID disk array controllers having a cache memory; and
    a first virtual solid state disk device defined within said cache memory for storage of information in a first of said plurality of RAID disk array controllers.

11. The RAID disk array of claim 10 wherein a second virtual solid state disk device is defined within said cache memory of a second of said plurality of RAID disk array controllers.

12. The RAID disk array of claim 11 wherein said second virtual solid state disk device in said second of said plurality of RAID disk array controllers mirrors said first virtual solid state disk device in said first of said plurality of RAID disk array controllers.

13. A RAID disk array including a plurality of disks comprising:

a plurality of RAID disk array controllers having a cache memory; and a first virtual solid state disk device defined within said cache memory within a first of said plurality of RAID disk array controllers wherein said virtual solid state disk device comprises a plurality of virtual disk drives configured to operate as a virtual RAID LUN.

14. The RAID disk array of claim 13 wherein said virtual RAID LUN includes at least one virtual solid state disk and at least one of said plurality of disks.

15. The RAID disk array of claim 13 further comprising:
a second of said plurality of RAID disk array controllers having a cache memory; and
a second virtual solid state disk device defined within said cache memory of said second of said plurality of RAID disk array controllers.

16. The RAID disk array of claim 15 wherein said second virtual solid state disk device in said second of said plurality of RAID disk array controllers mirrors said first virtual solid state disk device in said first of said plurality of RAID disk array controllers.

17. A method for configuring a virtual disk storage device in a RAID subsystem having a RAID disk array controller with a cache memory, said method comprising the steps of:
reserving a portion of said cache memory; and
logically configuring said portion as a virtual solid state disk storage device.

18. The method of claim 17 wherein the step of logically configuring includes the step of:
logically configuring said virtual solid state disk storage device into a plurality of virtual disk drives.

19. The method of claim 18 further comprising the step of:
managing said plurality of virtual disk drives as a virtual RAID LUN in accordance with a pre-selected RAID level management technique.

20. The method of claim 17 further comprising the step of:
storing information in said virtual solid state disk storage device in accordance with a pre-selected RAID level management technique.

21. The method of claim 17 wherein said subsystem includes a second RAID disk array controller with a second cache memory and wherein said second RAID disk array controller is operable as a redundant controller in cooperation with said RAID disk array controller and wherein the method further includes:
mirroring the contents of said portion in said cache memory to said second cache memory.

22. A data storage subsystem for storing data received from and providing stored data to a host computer, said storage subsystem comprising:
a disk array including a plurality of disk drives;
a storage controller that includes a CPU and a cache memory, wherein said cache memory includes a first memory partition and a second memory partition, said first memory partition stores data and control information related to data stored in said disk array, and said second memory partition provides a virtual solid state disk drive; and
a communication medium that provides communication between said storage controller and said disk array.

23. The storage subsystem of claim 22 wherein said virtual solid state disk drive provides private storage reserved for said storage controller.

24. The storage subsystem of claim 22 wherein said virtual solid state disk drive and said disk array in combination provide a virtual logical unit for said storage controller.

25. The storage subsystem of claim 22 wherein said second memory partition provides a plurality of virtual solid state disk drives, and said plurality of virtual solid state disk drives provide a virtual logical unit for said storage controller.

26. The storage subsystem of claim 22 wherein said plurality of disk drives each include rotatable storage media.

27. The storage subsystem of claim 22 wherein said storage controller is devoid of rotatable storage media.

28. The storage subsystem of claim 22 wherein said communication medium is a peripheral bus that does not provide communication between said CPU and said virtual solid state disk drive.

29. The storage subsystem of claim 22 wherein said first and second memory partitions are contiguous portions of said cache memory.

30. The storage subsystem of claim 22 wherein said storage controller stores information in said disk array and said virtual solid state disk drive in accordance with RAID storage management techniques.

31. The storage subsystem of claim 22 wherein said storage controller stores selected data in said virtual solid state disk drive and said storage controller does not store said selected data in said disk array.

32. The storage subsystem of claim 31 wherein said selected data includes log files.

33. The storage subsystem of claim 31 wherein said selected data includes transaction checkpoint data.

34. The storage subsystem of claim 31 wherein said selected data includes journal update data.

35. The storage subsystem of claim 31 wherein said selected data includes intermediate computational results.

36. The storage subsystem of claim 31 wherein said selected data includes parity information.

37. The storage subsystem of claim 31 wherein said selected data excludes check information.

38. The storage subsystem of claim 22 wherein said host computer provides a parameter to said storage controller that defines a characteristic of said virtual solid state disk drive.

39. The storage subsystem of claim 38 wherein said parameter defines said virtual solid state disk drive as a logical unit.

40. The storage subsystem of claim 38 wherein said parameter defines said virtual solid state disk drive as a high-performance logical unit relative to said plurality of disk drives.

41. The storage subsystem of claim 22 including a second storage controller that includes a second CPU and a second cache memory, wherein said second cache memory includes a third memory partition and a fourth memory partition, said third memory partition stores data and control information related to data stored in said disk array, and said fourth memory partition provides a second virtual solid state disk drive.

42. The storage subsystem of claim 41 wherein said second virtual solid state disk drive mirrors the contents of said first solid state disk drive.

43. The storage subsystem of claim 41 wherein said second memory partition provides a third virtual solid state disk drive, and said fourth memory partition provides a fourth virtual solid state disk drive.

44. The storage subsystem of claim 22 including a second communication medium that provides communication between said CPU and said virtual solid state disk drive, wherein a data transfer rate of said second communication medium is substantially higher than a data transfer rate of said communication medium.

45. The storage subsystem of claim 44 wherein said communication medium is an external peripheral bus and said second communication medium is a high-speed processor bus.

46. The storage subsystem of claim 22 wherein said virtual solid state disk drive mirrors the contents of one of said plurality of disk drives.

47. The storage subsystem of claim 46 wherein said one of said plurality of disk drives includes rotatable storage media.

48. The storage subsystem of claim 22 wherein said virtual solid state disk drive is configured as a spare disk drive.

49. The storage subsystem of claim 48 wherein said virtual solid state disk drive provides a hot spare for one of said plurality of disk drives.

50. The storage subsystem of claim 49 wherein said one of said plurality of disk drives includes rotatable storage media.

* * * * *

UNITED STATES PATENT AND TRADEMARK OFFICE
CERTIFICATE OF CORRECTION

PATENT NO. : 6,567,889 B1
DATED : May 20, 2003
INVENTOR(S) : Dekoning et al.

Page 1 of 1

It is certified that error appears in the above-identified patent and that said Letters Patent is hereby corrected as shown below:

<u>Title page,</u>
Item [*] Notice, please delete "748" and add -- 772 --.

Signed and Sealed this

Thirtieth Day of August, 2005

JON W. DUDAS
*Director of the United States Patent and Trademark Office*